Dec. 27, 1927.
L. MARX
1,653,717
FIGURE WHEELED TOY
Filed April 3, 1926
2 Sheets-Sheet 1
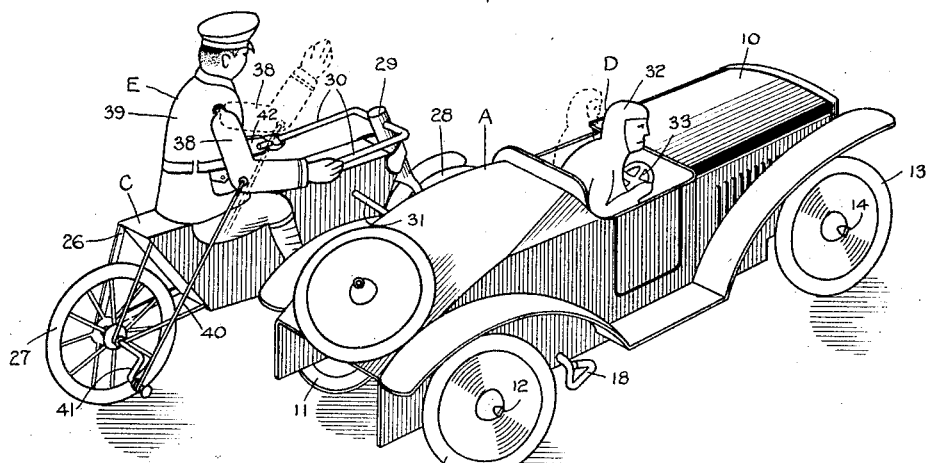
INVENTOR
Louis Marx
BY
Cavanagh & James
ATTORNEYS Dec. 27, 1927.

L. MARX 1,653,717

FIGURE WHEELED TOY

Filed April 3, 1926      2 Sheets-Sheet 2

INVENTOR
Louis Marx
BY
Cavanagh & James
ATTORNEYS

Patented Dec. 27, 1927.

1,653,717

UNITED STATES PATENT OFFICE.

LOUIS MARX, OF BROOKLYN, NEW YORK.

FIGURE WHEELED TOY.

Application filed April 3, 1926. Serial No. 99,440.

This invention relates to a toy, and more particularly to a figure wheeled toy.

The principal object of my present invention comprehends the provision of a figure wheeled toy constructed and designed so as to be operable to simulate the pursuit of an automobile vehicle, driven at a prohibitive speed, by a motorcycle traffic officer.

Further and more specific objects of the invention include the provision of a simulated automobile vehicle and motorcycle vehicle combined so as to be propelled by a unitary motor mechanism, the vehicles being arranged so as to represent the pursuit of the automobile vehicle by the motorcycle vehicle; the still further provision of a figure wheeled toy of this character in which the automobile vehicle is provided with a figure representing a motorist and the motorcycle vehicle is provided with a figure representing a traffic officer both operable in unison to represent the speeding action of the motorist and the pursuing action of the traffic officer.

Figure 4:
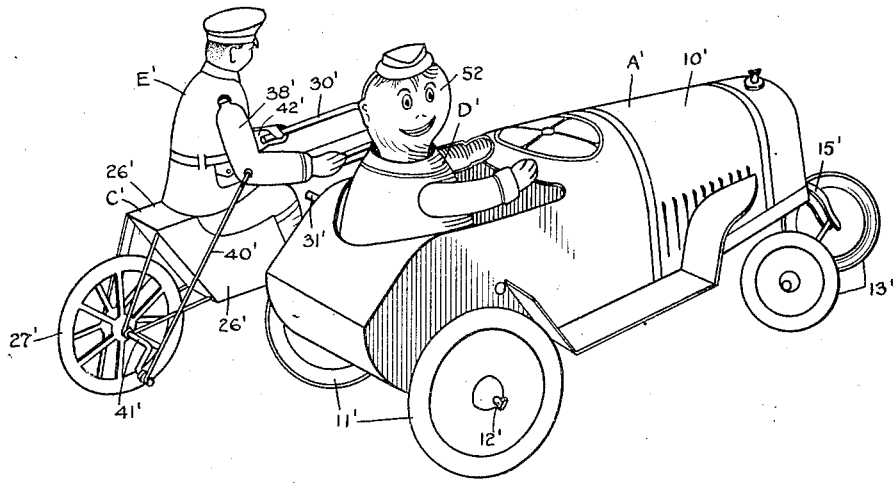
Figure 5:
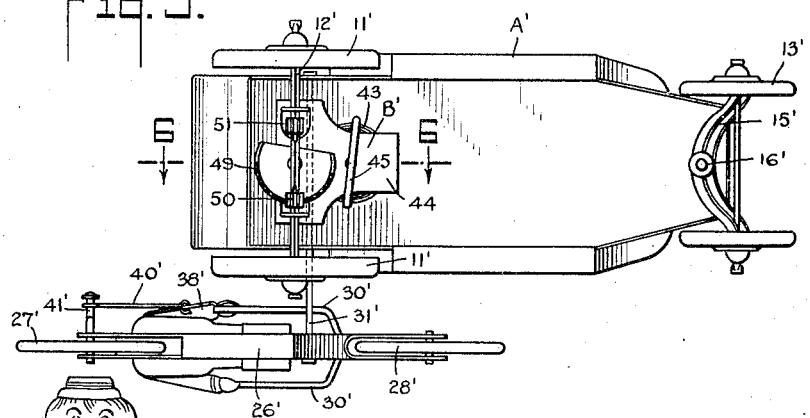
Figure 6:
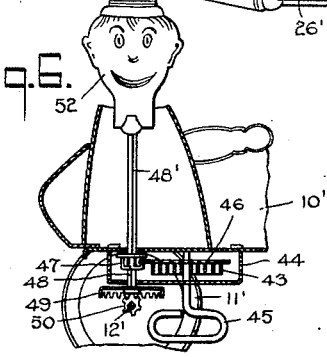

To the accomplishment of the foregoing and such other objects as will hereinafter appear, my invention consists in the elements and their relation one to the other as hereinafter particularly described and sought to be defined in the claims; reference being had to the accompanying drawings which show the preferred embodiments of my invention, and in which:

Fig. 1 is a perspective view of one form of figure wheeled toy embodying my present invention, Fig. 2 is a side elevational view thereof with parts broken away, Fig. 3 is a bottom plan view thereof, Fig. 4 is a perspective view showing a modified form of figure wheeled toy embodying the invention, Fig. 5 is a bottom plan view thereof, and Fig. 6 is a detailed view taken in cross-section in the plane of the line 6—6, Fig. 5.

Referring now more in detail to the drawings and having reference first to Figs. 1 to 3 thereof, the figure wheeled toy of my invention comprises a simulated automobile vehicle A having a motor means B for propelling the same and a simulated motorcycle vehicle C attached to the vehicle A so as to be propelled therewith and arranged relatively thereto so as to resemble the movement of the motorcycle vehicle C in pursuit of the fleeing automobile vehicle A, the latter having a figure D representing a motorist and actuated to resemble a driving action at an excessive speed or an attempt to flee the pursuing motorcycle vehicle C, and the motorcycle vehicle having a figure E thereon representing a traffic officer operated so as to resemble the signalling to the motorist of a stop or halting command.

The automobile vehicle A comprises a chassis or body 10 preferably made of sheet metal and designed or contoured preferably in semblance of a racing car or roadster, a pair of rear wheels 11, 11 fixed to a shaft 12 journalled in the side walls of the body 10, and a pair of front wheels 13, 13 carried by a shaft 14 which is journalled in a yoke member 15 fixed to the under side of the body 10 and pivoted thereto for movement about a vertical axis 16 for steering purposes.

The motor B is preferably of the spring-operated type and comprises a spring motor means 17 of any approved type having a winding key 18 extending through a side wall of the body or chassis 10 so as to be readily accessible for winding the motor, the said motor being connected to operate the rear axle 12 by means of a gear train 19, which gear train comprises a gear wheel 20 fixed to the drum 21 of the motor and meshing with a pinion 22 fixed to an intermediate shaft 23, the said pinion being joined to a gear wheel 24 which in turn meshes with a pinion 25 fixed to the rear wheel shaft 12. With this construction it will be apparent that when the motor is energized the rear wheels will be operated to propel the vehicle along the ground or other suitable support.

The simulated motorcycle vehicle C comprises a motorcycle frame 26 also suitably made of sheet metal having a rear wheel 27 journalled therein and a front wheel 28 journalled in a steering fork and post 29 which is in turn fixed to the motorcycle frame 26, the said steering post being provided with a pair of extended handle bars 30, 30. The motorcycle vehicle C is attached to the simulated automobile vehicle A by means of a connecting rod 31 which is passed transversely through the motorcycle frame 26 and the automobile frame 10 and joined to the side walls thereof, the vehicles being arranged one in advance of the other, as shown in the drawings, so as to simulate the movement of the motorcycle vehicle in close pursuit of the automobile vehicle.

The motorist figure D is, as heretofore stated, operated to resemble a driving action at an excessive speed or an attempt to flee or escape the advance of the motorcycle vehicle, and to accomplish the desired effect the said figure comprises a body part 32 made of sheet metal and having a configuration resembling a racing motorist at the steering wheel 33, which body part is mounted for cyclic movement about a vertical axis; and in the form of the invention shown in Figs. 1 to 3, the said figure body 32 is mounted for oscillating motion from side to side of the vehicle to and from positions indicated by the full and dotted lines in Fig. 1 of the drawings, the said figure being fixed to a rock shaft 34 oscillatable in a suitable portion of the frame body 10, the said rock shaft being provided with a rocking arm 35 connected to a crank portion 36 of the intermediate shaft 23 of the motor mechanism B by means of a connecting rod 37, as clearly shown in Figs. 2 and 3 of the drawings.

The motorcycle figure E also preferably made of sheet metal, contoured, designed and ornamented to represent a traffic officer, embodies means which is actuated to resemble the signalling to the fleeing motorist to bring his vehicle to a halt, said means comprising in the preferred construction an arm 38 oscillatable on a body 39 of the figure E and movable between the positions shown in full and dotted lines in Fig. 1 of the drawings to indicate the giving of a "stop" command by any suitable mechanism such, for example, as by means of a connecting rod 40 connected at one end to the arm 38 and at its other end to a crank portion 41 of the rear motorcycle axle. The other arm 42 of the officer figure may be appropriately affixed to one of the handle bars 30 of the motorcycle vehicle.

It will be apparent from this construction that when the motor B is energized the automobile vehicle A and the motorcycle vehicle C will both be propelled forwardly along the ground or other suitable support in resemblance of a chase between a traffic officer and a fleeing motorist and the traffic officer figure E will be operated by the propulsion of the vehicle to resemble the giving of a halting command, the motorist figure D being operated by the propulsion of the vehicles to resemble a driving action at a prohibitive speed.

Referring now to Figs. 4 to 6 of the drawings, I show a modification of my invention in which the vehicles are propelled first forwardly and then rearwardly to impart a more erratic action to the motorist and pursuing officer and in which the head of the motorist figure is operated so as to move forwardly when the vehicle is propelled in one direction and move rearwardly when the vehicle is propelled in the opposite direction. In other respects the vehicles and the operated parts are similar to the form of the invention shown in Figs. 1 to 3 and such parts are designated by similar and primed reference characters.

The motor mechanism B' in the form of the invention shown in Figs. 4 to 6 of the drawings comprises a spring motor 43 journalled in a bracket 44 and provided with a winding key 45, said spring motor having a driving gear 46 (Fig. 6) meshing with a pinion 47 fixed to a shaft 48, said shaft having a segmental gear 49 adapted to mesh first with a pinion 50 and then with a second pinion 51 both fixed to the rear wheel shaft 12', the construction being such that the alternating engagement of the segmental gear 49 with the pinions 50 and 51 effects the alternate propulsion of the vehicles forwardly and rearwardly.

In this form of the invention, the motorist figure D' is provided with a body part such as a head 52 rotatable about a vertical axis, said head being moved forwardly when the vehicle is propelled in one direction and being moved rearwardly when the vehicle is propelled in the opposite direction. To accomplish the effect in a simple manner, the head 52 is affixed to an extended portion 48' of the shaft 48, the head being continuously rotated in one direction as the vehicles are propelled, the head being turned rearwardly and then forwardly in alternate sequence as the direction of movement of the vehicle is reversed.

The use and operation of the figure wheeled toy of my present invention will in the main be fully apparent from the above detailed description of the construction and operation thereof. It will be further apparent that while I have shown my invention in preferred forms, many changes and modifications may be made in the structure disclosed without departing from the spirit of the invention, defined in the following claims.

I claim:

1. A figure wheeled toy comprising a simulated automobile vehicle, a spring motor therein for propelling the same, a movably mounted figure on the vehicle representing a motorist, a simulated motorcycle vehicle attached to the automobile vehicle so as to be propelled therewith, an actuatable figure on the motorcycle vehicle representing a traffic officer in pursuit of the motorist, and means operated by the propulsion of the vehicles for actuating the traffic officer figure to resemble the signalling to the motorist of a "stop" or halting command and for moving the motorist figure to resemble his driving action at an excessive speed.

2. A figure wheeled toy comprising a simulated automobile vehicle, a spring motor therein for propelling the same, a figure representing a motorist having a part mounted on the vehicle for movement about a vertical axis, a simulated motorcycle vehicle attached to the automobile vehicle so as to be propelled therewith, a figure on the motorcycle vehicle representing a traffic officer in pursuit of the motorist and having an arm movable cyclically to halt signalling positions, and means operated by the propulsion of the vehicles for actuating the arm of the traffic officer figure to resemble the signalling to the motorist of a "stop" or halting command and for moving the motorist figure cyclically about its axis to resemble driving action at an excessive speed.

3. A figure wheeled toy comprising a simulated automobile vehicle, a spring motor therein for propelling the same, a movably mounted figure on the vehicle representing a motorist, a simulated motorcycle vehicle attached to the automobile vehicle so as to be propelled therewith, a figure on the motorcycle vehicle representing a traffic officer in pursuit of the motorist and means operated by the propulsion of the vehicles for moving the motorist to resemble a motor driving action.

4. A figure wheeled toy comprising a simulated automobile vehicle, a spring motor therein for propelling the same, a figure representing a motorist having a part mounted on the vehicle for movement about a vertical axis, a simulated motorcycle vehicle attached to the automobile vehicle so as to be propelled therewith, a figure on the motorcycle vehicle representing a traffic officer in pursuit of the motorist and means connecting said motor with said motorist figure for moving the movable part thereof about its vertical axis.

5. A figure wheeled toy comprising a simulated automobile vehicle, a spring motor therein for propelling the same, a figure representing a motorist having a part mounted on the vehicle for movement about a vertical axis, a simulated motorcycle vehicle attached to the automobile vehicle so as to be propelled therewith, a figure on the motorcycle vehicle representing a traffic officer in pursuit of the motorist and having an arm movable cyclically to halt signalling positions, and means connecting a tractive wheel of the motorcycle vehicle with the said arm for actuating the same to resemble the signalling to the motorist of a "stop" or halting command and means connecting said motor with the motorist figure for moving the movable part thereof about its vertical axis to resemble a vehicle driving action.

6. A figure wheeled toy comprising a simulated automobile vehicle including a propelling means, a spring motor means therefor and mechanism operative for propelling the vehicle backwards and forwards, a figure on the vehicle representing a motorist having a head mounted for rotation, a simulated motorcycle vehicle attached to the automobile vehicle so as to be propelled therewith, a figure on the motorcycle vehicle representing a traffic officer in pursuit of the motorist and means connecting the head of the motorist figure with the propelling means operated by the propulsion of said vehicle for rotating the head of the motorist figure, said connecting means comprising devices for moving said head forwardly when the vehicle is propelled in one direction and rearwardly when the vehicle is propelled in the opposite direction.

7. A figure wheeled toy comprising a simulated automobile vehicle having rear drive wheels and front steering wheels, means for mounting the front steering wheels for free rotation about a vertical axis, a spring motor on the vehicle, means connecting the motor with the rear wheels operative for propelling the vehicle backwards and forwards, a figure on the vehicle representing a motorist having a head mounted for rotation, and means connecting the motor with said head for rotating the same, said connecting means comprising devices for moving said head forwardly when the vehicle is propelled in one direction and for moving said head rearwardly when the vehicle is propelled in the opposite direction.

Signed at New York city in the county of New York and State of New York this 29th day of March, A. D. 1926.

LOUIS MARX.